US006267544B1

(12) United States Patent
Neville

(10) Patent No.: US 6,267,544 B1
(45) Date of Patent: Jul. 31, 2001

(54) LOG POSITIONING AND SECURING DEVICE

(75) Inventor: Richard L. Neville, Victor, MT (US)

(73) Assignee: Nevilog, Inc., Victor, MT (US)

( * ) Notice: Subject to any disclaimer, the term of this patent is extended or adjusted under 35 U.S.C. 154(b) by 0 days.

(21) Appl. No.: 09/404,927

(22) Filed: Sep. 24, 1999

(51) Int. Cl.[7] .................................................... A01G 23/02

(52) U.S. Cl. .................... 414/23; 414/745.1; 414/745.7; 414/751.1; 414/746.4; 144/242.1

(58) Field of Search .................................. 414/23, 745.1, 414/745.7, 745.8, 745.9, 746.3, 746.4, 751.1, 749.1; 144/242.1

(56) References Cited

U.S. PATENT DOCUMENTS

| | | | | |
|---|---|---|---|---|
| 3,911,981 | * | 10/1975 | Tucek | 414/745.1 |
| 4,173,237 | * | 11/1979 | Heikkinen et al. | 144/34 |
| 4,226,270 | * | 10/1980 | Sturtz et al. | 144/22 |
| 4,264,267 | * | 4/1981 | Luben | 414/745.1 |
| 4,294,149 | * | 10/1981 | Olsson | 83/435.1 |
| 4,352,488 | * | 10/1982 | Cremona | 269/54.2 |
| 4,378,035 | | 3/1983 | Chisum | 144/1 R |
| 4,448,298 | * | 5/1984 | Matsuo | 414/745.1 |
| 4,665,786 | * | 5/1987 | Shields | 83/364 |
| 4,867,213 | * | 9/1989 | Bolton et al. | 144/357 |
| 4,869,303 | * | 9/1989 | Nunnery et al. | 144/193 A |
| 5,261,809 | * | 11/1993 | Koga | 425/451.5 |

* cited by examiner

*Primary Examiner*—Joseph A. Fischetti
(74) *Attorney, Agent, or Firm*—Wells, St. John, Roberts, Gregory & Matkin, P.S.

(57) ABSTRACT

A log positioning and securing device is described in which a frame supports a log receiving trough with sides positioned to receive and support a log along a longitudinal plane. A log clamp including a pair of log clamp members is movably mounted to the frame. The clamp members are driven to move between an inoperative position in which the log clamp members are separated in a log receiving position, and a log clamping position in which the log clamp members are moved toward one another and toward the longitudinal plane, to clamp and hold a log securely along the rough, with the centerline of the log parallel to or coincidental with the plane.

18 Claims, 5 Drawing Sheets

LOG POSITIONING AND SECURING DEVICE

TECHNICAL FIELD

The present invention relates to the field of log home construction and more particularly to machinery used to secure logs for forming operations used in log home construction.

BACKGROUND OF THE INVENTION

Log home construction, once a building form born of necessity, is still desirable, not in the least for its romantic, aesthetic appeal. Properly designed and constructed log homes are attractive for their structural longevity and for their warm rustic ambiance.

Improvements have been made in the processes used in milling logs for log home construction, to simplify construction and make the structures more thermally efficient. One such improvement has been to mill the logs for a house to a constant cylindrical shape. This eliminates the time consuming and technically demanding need to arrange and fit tapered logs together. To this end, various milling apparatus has been developed. Such mills turn or shape the logs to a specific determined diameter. It is typical then that the milled logs are moved on to a forming machine where a cutting head is operated to form one or more formed grooves along the log length. The grooves or notches are used to eliminate an age old problem with log construction, what to do about the narrow gap between adjacent logs (the point where one log rests on the log below).

There is a need for a milling arrangement that will produce consistent groove that is centered along a log, considering the fact that logs are not always straight, even after milling. Milling machines typically run along straight tracks, and mill a straight groove along logs that are held on a work support frame. If a straight groove is cut along a crooked log, the log will not set plumb when laid up with the remaining logs in a wall. This seriously detracts from the overall appearance of the structure. However, many present log milling machines have not been adequately designed with a solution to the above problem in mind.

It is often desirable to visually inspect a log to determine the best location for the longitudinal groove. The decision may be made depending on the location of cracks, knots, or bark remaining on the log.

U.S. Pat. No. 4,78,035 is exemplary of a lathe type mill where the problem of providing straight notches is solved by forming the notches while the log is held between the head and tail stock of a lathe. The notches are cut following turning of the log to a prescribed diameter. While this may be fairly effective, it requires that the log be held at its ends and that the lathe remain non functional while the grooving operation takes place. Thus, log production is delayed while the grooves are cut. The log securing apparatus (which in effect is the head and tail stock of the lathe) must be locked to prevent rotation of the log during the groove forming operation.

The above machinery may be functional for short log, lathe milling operations. However, high quality long log production in which logs of various lengths are moved through rotary cutters, cannot make effective use of end engaging head and tail stocks to hold logs for longitudinal groove formation. This is due in part to the long log lengths. Logs are naturally flexible and long logs will bow or sag between lathe centers. Further, if a log has even a slight tendency to bend, head and tail stocks can do little to straighten the bend.

The present invention thus has for an objective, provision of a device that will securely hold a log in place for longitudinal groove forming operations.

Another objective is to provide such a device that will operate independently of a log forming machine, and thereby not interfere or slow operation of the log forming machine.

A further objective is to provide such a device that will permit rotation of an engaged log prior to clamping.

A still further objective is to provide such a device that may straighten a log during the groove forming operation.

Another objective is to provide such a device that is simple in construction and relatively easy to operate.

The above and still further objects and advantages may become apparent from the following description which, taken with the appended drawings and claim, describe and define a preferred mode of carrying out the present invention.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
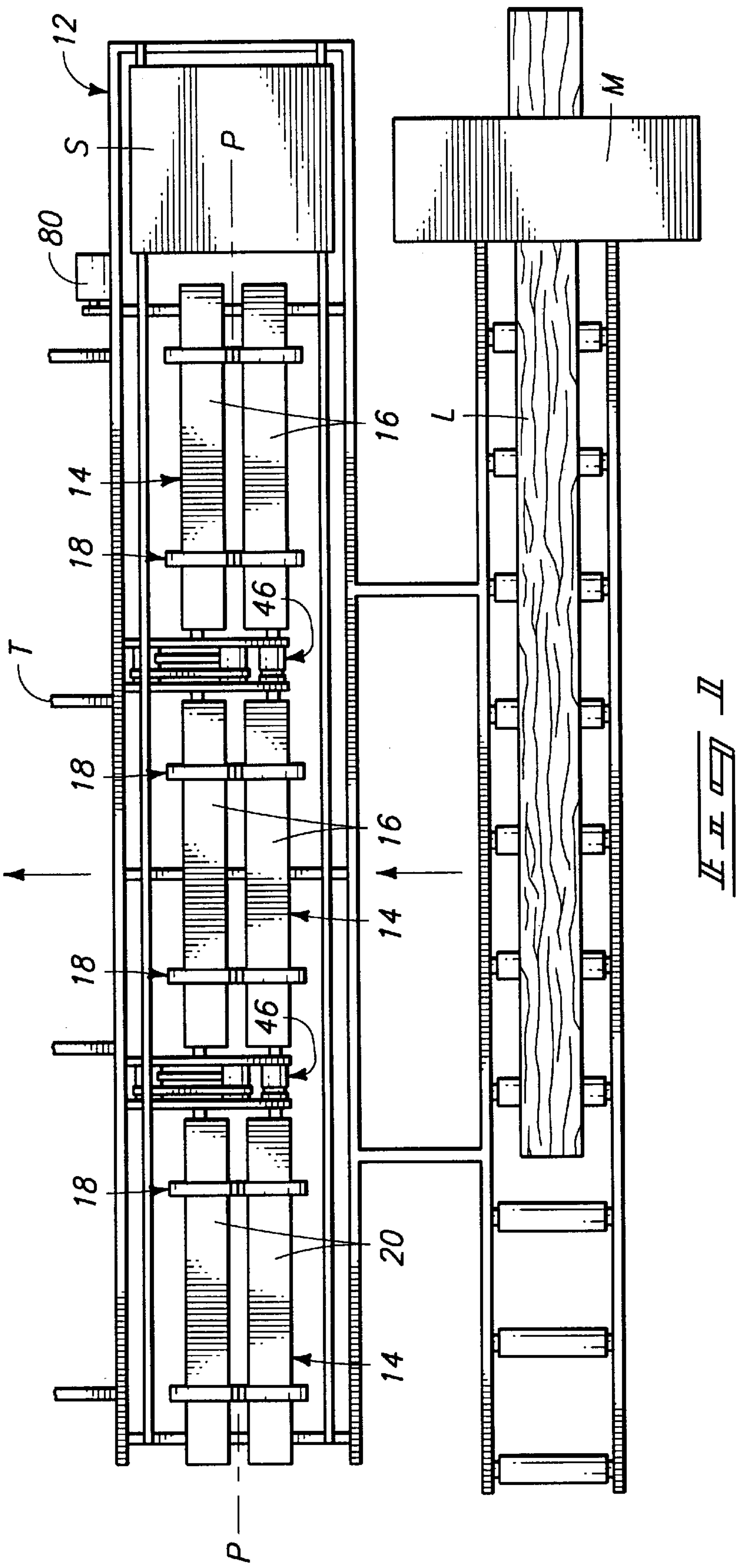
FIG. 1 is a diagrammatic view illustrating the location of a preferred log securing and positioning device in relation to other log forming equipment.

This disclosure of the invention is submitted in furtherance of the constitutional purposes of the U.S. Patent Laws "to promote the progress of science and useful arts" (Article 1, Section 8).

A preferred log positioning and securing device is generally designated by the reference numeral 10 in the accompanying drawings. The present securing device 10 is intended to receive and hold a log L straight along a reference plane P as preparation for forming a longitudinal notch or groove G (FIGS. 4, 5) along the length of the log. This may be done by operation of a shaping device S (FIG. 1) that is not a part of the present application, but that may be mounted to the frame 12 for movement along a log L.

In practice, the present device 10 will preferably be placed to one side of a log forming machine as generally shown at M in FIG. 1. The present device will operate independently and will not interfere with operation of the log forming machine.

More specifically, a preferred log securing device 10 includes a frame that 12 is rigid and capable of being securely mounted to a floor or other secure mounting surface. The frame 12 may be made to any reasonable length depending upon the longest log to be secured. The frame is upright and supports a log receiving trough 14.

The preferred trough 14 includes trough sides 16 that are positioned to receive and support a log L along longitudinal plane P. The illustrated example shows the trough sides 16 as being substantially "V" shaped. The sides 16 need not meet, but lie in converging planes that meet at a vertex situated on or at least closely adjacent to the longitudinal plane P.

A straight, cylindrical log placed in the trough 14 will be automatically centered by the converging sides 16 with the log center axis lying in the plane P. A bent log can be straightened along the trough walls by operation of clamp arrangements described below.

In practice, several sets of the trough sides 16 may be provided, aligned along the frame 12 and spaced apart to permit operation of log clamps 18, and log ejectors 20, both of which are mounted to the frame 12 in sets that are positioned for movement in relation to the trough.

The log clamps 18 are comprised of clamp members 20 that are driven to move between:

1. an inoperative position in which the log clamp members are separated in a log receiving position (FIG. 2), and 2. a log clamping position (FIGS. 3 and 4) in which the log clamp members 20 are moved toward one another with respect to a central reference (specifically the plane P) that is positioned at least approximately adjacent to the longitudinal plane.

Preferred log clamp members 20 are semi-circular in configuration. The clamp members are also substantial mirror images of one another, with concave surfaces that face one another when in the operative position. Lower ends of the clamp members in each set are pivotably mounted by means of a linkage 22 to vertically movable posts 24 that are substantially centered on the longitudinal plane P. The preferred posts 24 are slidably carried for linear vertical movement by guides 26 that are affixed to the frame 12.

In preferred forms of the present securing device 10, a crank linkage 28 is connected between the frame 12 and each post 24. The linkages 28 are functional to elevationally move the posts 24 to pull the log clamp members together and toward the trough walls from the log receiving position.

A log L resting in the trough 14 may thus be clamped between the several sets of log clamp members 20, and be forcibly pulled against the trough walls 16. The clamps thus serve to hold the log L secure during grooving or other milling operations, and to straighten the log with respect to the plane P. Thus held, the central axis of the log will lie substantially parallel and preferably within the plane P.

The preferred linkage 28 for each of the clamp arrangements includes a connecting rod 30 as part of a common clamp actuator that is pivotably connected at top end to an associated post 24. A bottom end of the rod 30 is similarly connected to a bellcrank 32.

The clamp actuator also includes a bellcrank 32 for each linkage 28 that is mounted for pivotal motion in response to partial rotation of a drive shaft 34 that extends the length of the frame and connects all the clamp arrangements. The drive shaft 34 is journalled on the frame along a longitudinal axis (preferably parallel to the plane P) and is pivoted by extension and retraction of a cylinder 36, mounted between the frame 12 and a crank arm 38 that is secured to the shaft.

As the shaft 34 rotates, the several bellcranks 32 will also swing up or downwardly, transmitting such motion through the connecting rods 30 to the posts. The posts, which are permitted only vertical movement, will move: up to allow the clamp members 20 to separate; and downwardly to pull the clamp members closed. The clamp members close as the lower clamp member ends are pulled downwardly and as the outward surfaces of the members slide over adjustment studs 40 that are mounted to the frame 12.

The headed ends of the studs 40 are adjustable toward or away from one another to facilitate selective adjustment of spacing between the clamp members in the operative position. In practice the studs 40 may be simple headed bolts, threadably engaging stationary parts of the frame. The clamp members will slide across the bolt heads as the posts 24 are moved vertically. Upward movement of the post will result in the clamp members separating (by gravity). Downward movement of the post will result in the clamp members sliding over the studs and moving together by an amount dependent upon spacing of the headed stud ends.

A log ejector 46 is provided in preferred forms of the invention, and is mounted to the frame 12 for movement in relation to the trough 14. The ejector is selectively movable between a first position below the trough (FIGS. 2–4) and a second position above the first position (FIG. 5). Several ejectors 46 are provided along the frame as shown in FIG. 1. The ejectors 46 are configured so that when in the second position a log is allowed to roll laterally from the trough of the present device onto a side table T (FIG. 1) for further processing.

Each ejector 46 is preferably comprised of an ejector bar 48 that has one end pivoted on the frame. The preferred ejector 46 is operated by the same drive shaft 34 that operates the clamp members 20.

Figure 2:
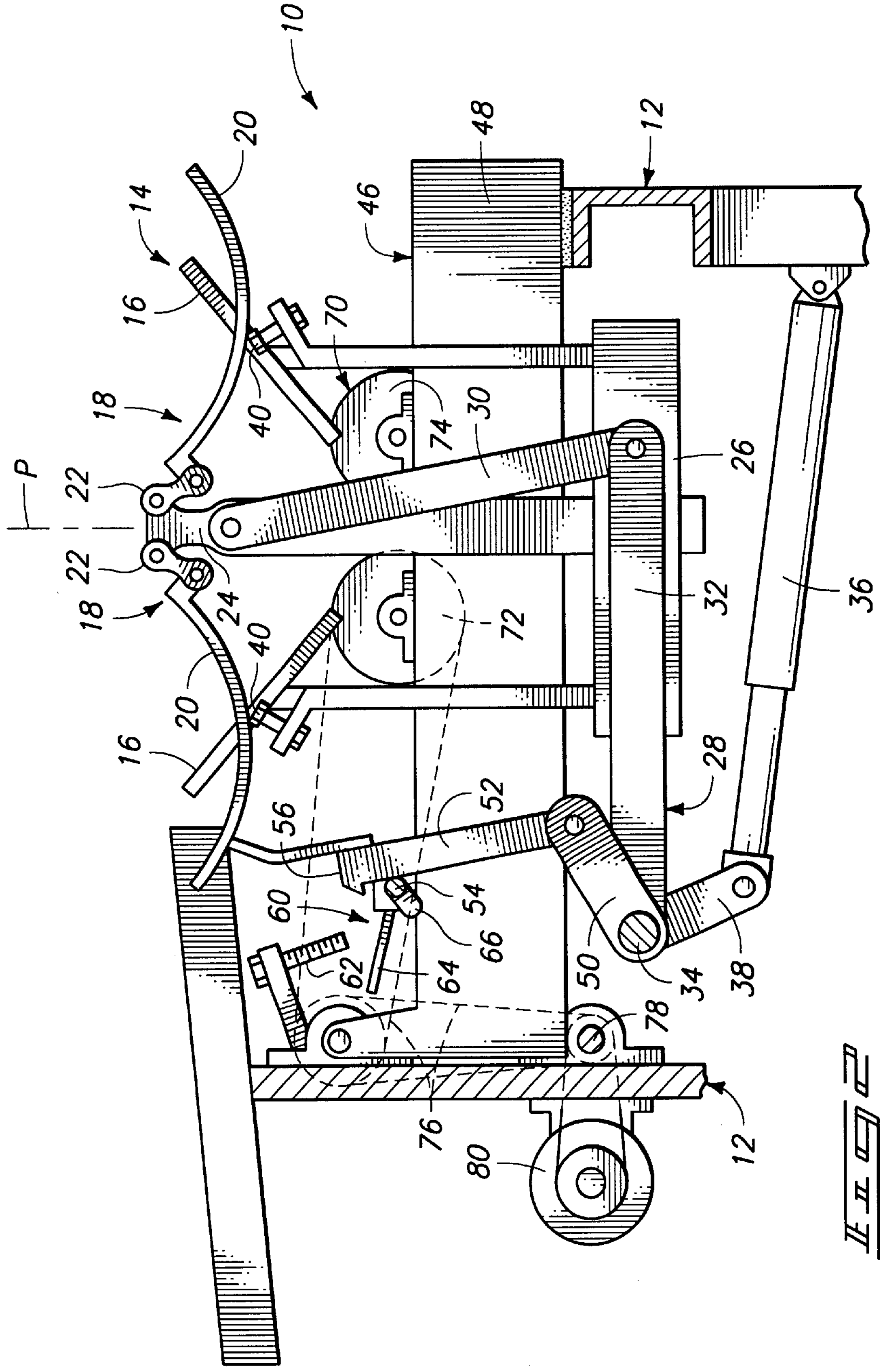
FIG. 2 is an enlarged view showing one of several preferred log securing and positioning stations along a frame, with the associated clamp members in an inoperative position in which the log clamp members are separated in a log receiving position.

The ejectors are operated by short crank arms 50 that pivotably mount trip bars 52. The trip bars 52 extend upwardly and lean against catch members 54 (FIG. 2). The catch members 54 are pivotably mounted on the ejector bars 48.

Figure 4:
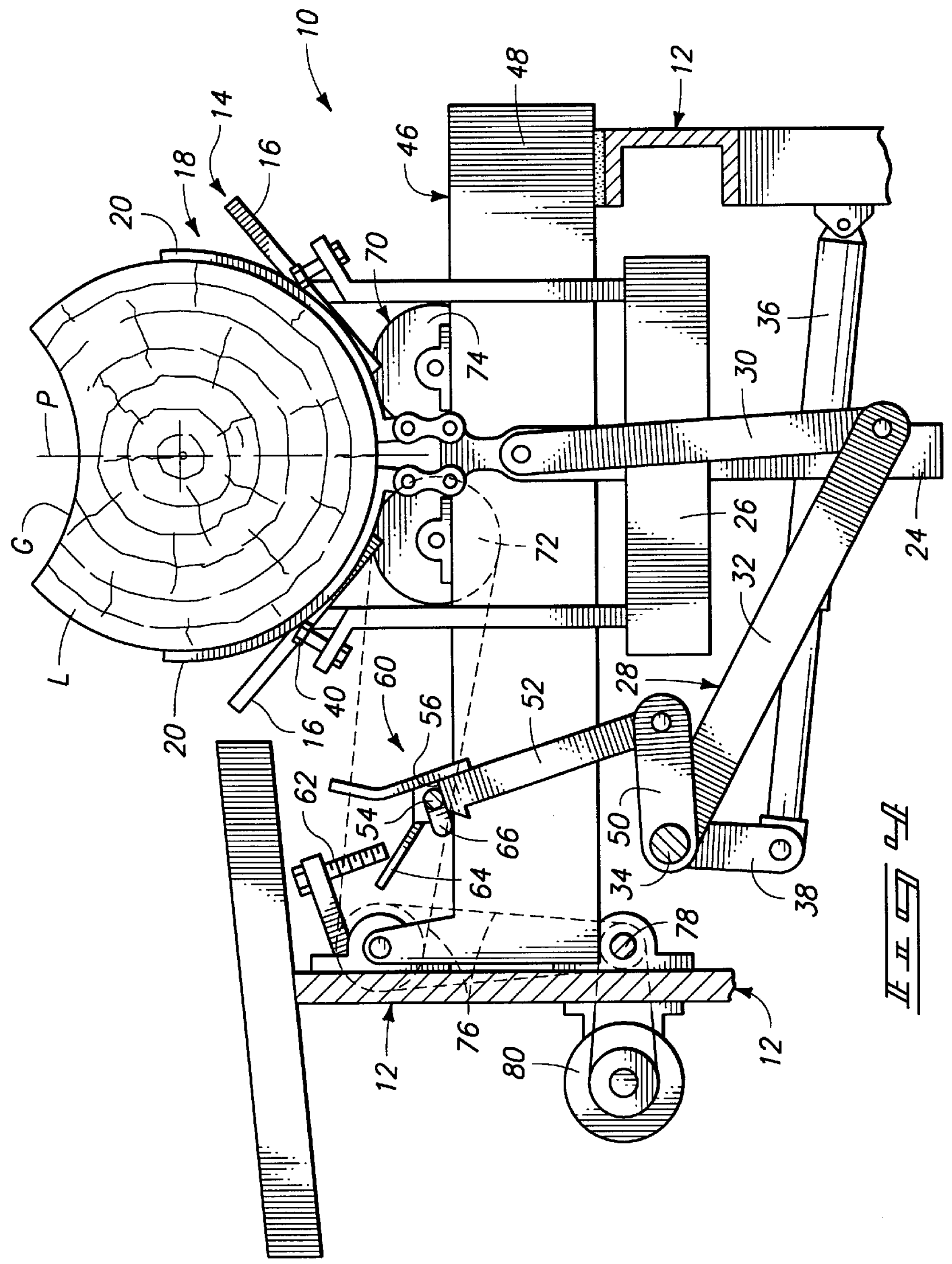
FIG. 4 is a view similar to FIG. 3 only showing the log after formation of a groove therein.
Figure 5:
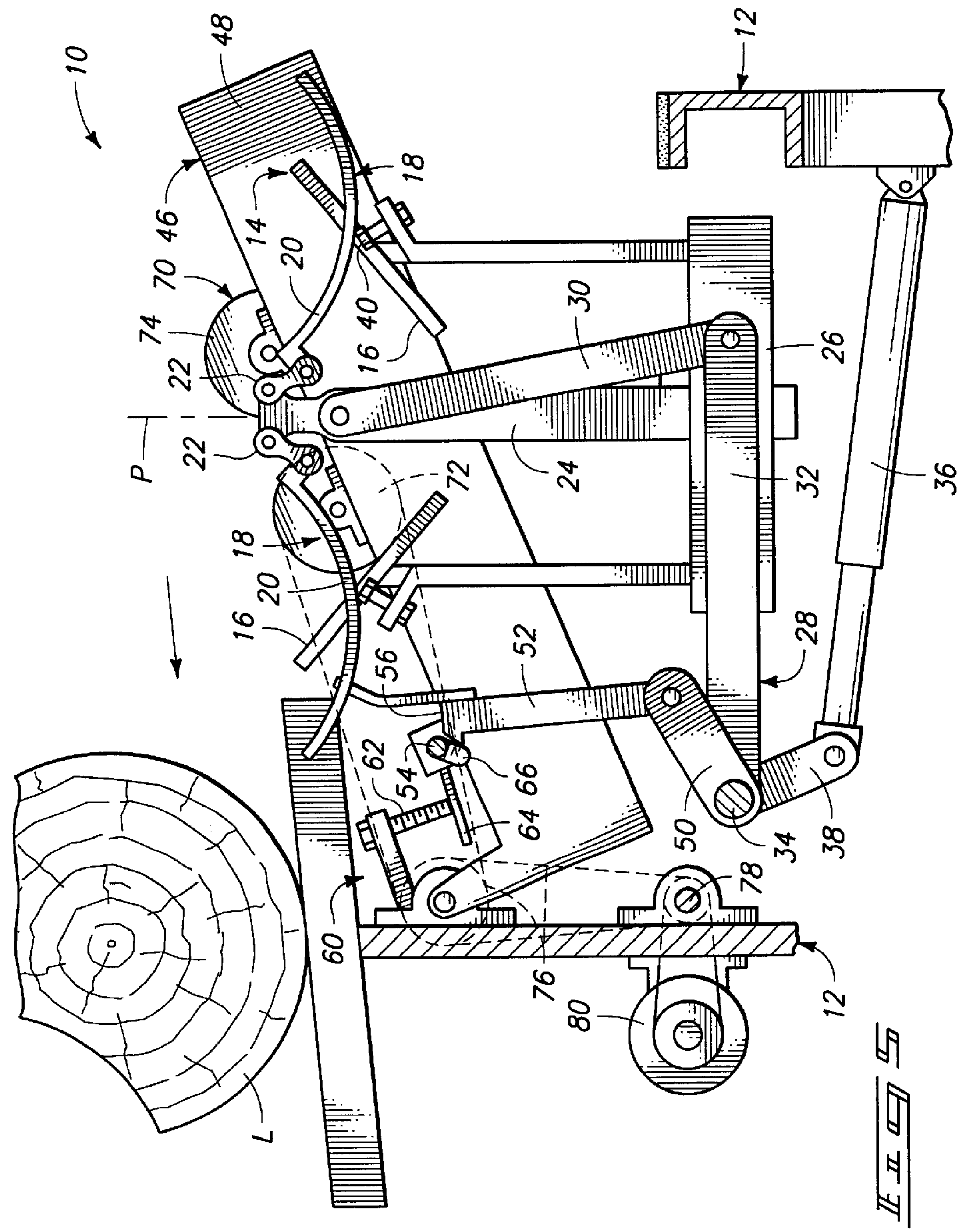
FIG. 5 is a view similar to FIG. 4 only showing operation of a preferred log rotator ejector.

Angular motion of the drive shaft 34 to swing the crank arms 50 downwardly will cause the trip bars 52 to slide along the catch members 54 until top ends 56 of the trip bars tip under the catch members 54 (see FIG. 4). Then, when the drive shaft is rotated to swing the crank arms 50 back upwardly, the top ends 56 of the trip bars 52 will act against the catch members 54 and pivot the ejector bar upwardly.

A release mechanism 60 is provided for each of the trip bars 52, to release the ejector bars 48 from the catch members 54 at the second position of the ejector 46. Adjustable fingers 62 are mounted to the frame, with downwardly oriented ends adjustably positioned in the paths of pans 64 that are mounted to the catch members 54.

As the ejector bars swing upwardly, the fingers 62 engage the pans 64 and cause the catch members 54 to rotate. Cams 66 that are affixed to the catch members 54 thus rotate toward the trip bars, pushing them out from under the catch members, thereby allowing the ejector bars to drop by gravity back to their first positions.

The above sequence is demonstrated by FIGS. 4 and 5. In FIG. 4, the trip bars have slid under the catch members and the crank arms 50 are starting their upward stroke. In FIG. 5, the crank arms are at the peak of the upward stroke and the fingers 62 have engaged and pivoted the cams 66 to slide the trip bars out from under the catch members 54. Once the trip bars 52 are removed from their supporting positions under the catch members 54, the ejector bars become free to swing back down by gravity to the starting position shown in FIG. 2.

It is pointed out that the above is an example of a preferred ejector mechanism, and that other apparatus could be substituted without departing from the scope of my invention. For example, a separate cylinder (not shown) could be provided for each ejector bar, mounted between the ejector bar and the frame in such a manner that extension and retraction of the cylinder would cause pivotal motion similar to that described above. Also, a single cylinder (not shown) could be connected to a common pivot shaft for the ejector bars by way of a bellcrank to achieve similar results. Other mechanisms could be provided as well.

A log rotator 70 is mounted in preferred forms of the present device 10 to the frame 12 and is operable to selectively rotate a log L on its center axis. Preferably the log rotator 70 is positioned to engage and rotate a log to a selected position in relation to the trough 14. Rotators 70 are mounted to at least two and more preferably all of the log ejector bars 48.

Each preferred rotator 70 is comprised of a pair of rollers 72, 74, one of which (72) is driven to rotate by a chain and sprocket linkage 76. All of the provided rollers 72 are preferably driven by a common drive shaft 78, which may be connected to an appropriate 71 conventional electric motor 80 or other source of rotary power. The powered rollers 72 may be selectively actuated when the ejector bars 48 are partially raised (enough to clear the log from the clamps and trough), to rotate the engaged log about its longitudinal axis, thus allowing an operator to select the most appropriate side of the log for shaping.

Operation of the present device will be described beginning with a log being received from the log forming machine M, and with the clamp members 20 in the receiving position shown in FIG. 2.

The log leaving the machine M can be rolled laterally into the open clamp members 20 which may then be closed to grasp the log and pull it downwardly and firmly into the trough 14.

The trip bars 52 will slide under the catch members 54 at this point, enabling operation of the rotator 70. To operate the rotator, the drive shaft 34 may be partially rotated to lift the trip bars 52 and posts 24 slightly. This releases the clamping force and slightly elevates the log from the trough 14. Now the rotator 70 may be operated to rotate the log, to a desired orientation. When the log is in the desired orientation, the clamps and ejector may be lowered and the clamps will automatically clamp and hold the log against the trough 14 as shown by FIG. 3.

Figure 3:
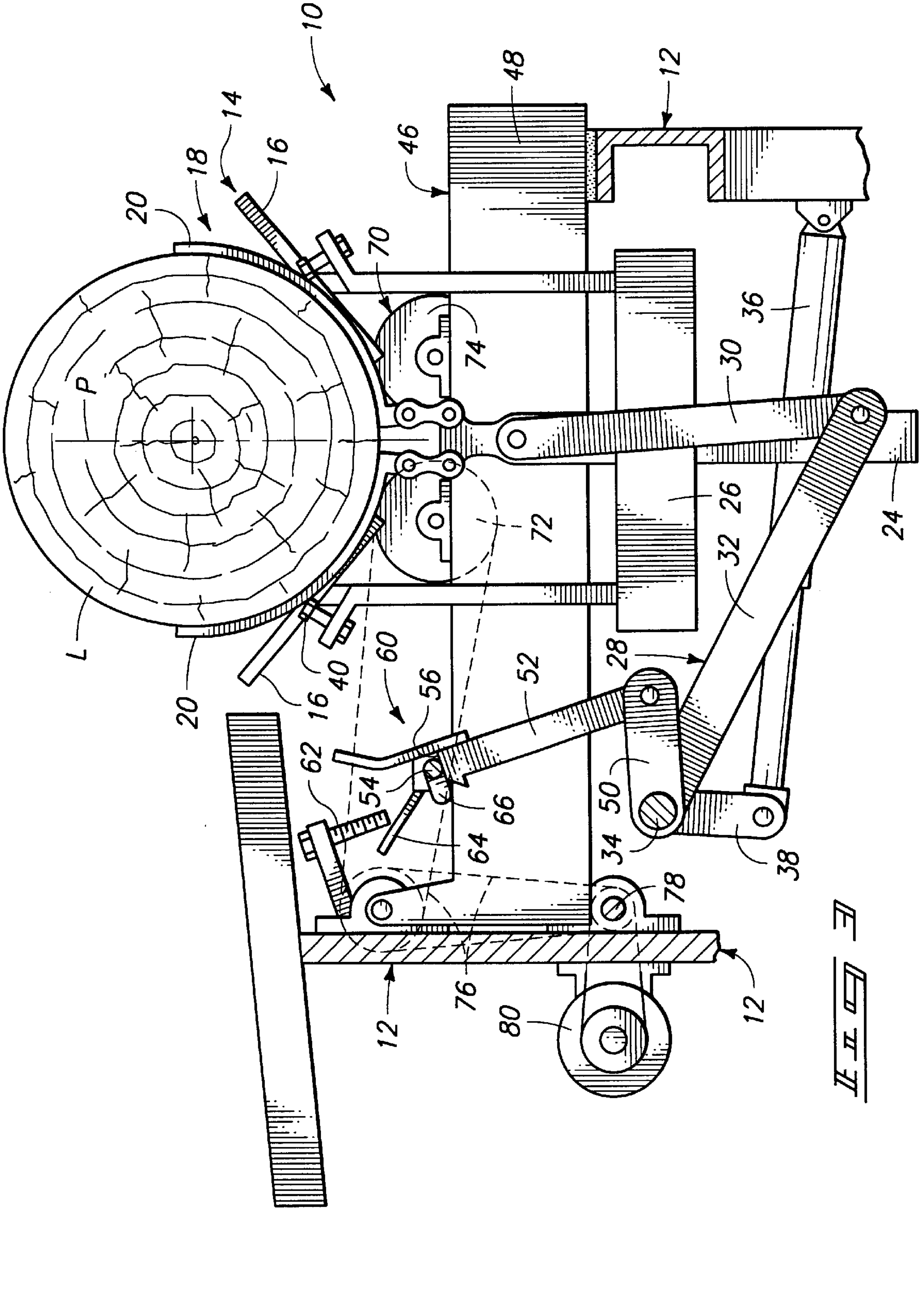
FIG. 3 is a view similar to FIG. 2 only showing a log in place and the clamp members in an operative position, securing and holding the log against sides of a preferred trough.

The trough sides 16 will center the log with respect to the fixed reference plane P (FIG. 3). Also, the clamp members 20 will hold the log firmly in this position with the exposed top surface (between the top ends of the clamp members 20) set for operation of the groove or other shape forming machine S, which may be moved along, the length of the log to form whatever surface configuration is desired (FIG. 4).

Once the top of the log is formed, the operator (or appropriate automated control equipment) may operate the ejector to discharge the finished log laterally of the present device. This is done by rotating the drive shaft 34 to lift the crank arms 50 and 32. Crank 32 will lift other clamp members which will open and release the log. At the same time the crank 50 will operate the trip bars 52 to swing the ejector bars 48 up to an angle where the log will roll laterally off the device (FIG. 5) for further handling by other equipment. At the top of the stroke, the cams 66 will push the trip bars out from under the catch members and allow the ejector bars 48 to drop back to the first position. This completes the operational cycle and the device is now ready for another log.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A log positioning and securing device, comprising:

a frame;

a log receiving trough on the frame including trough sides positioned to receive and support a log along a longitudinal plane;

a log clamp including a pair of log clamp members movably mounted to the frame;

wherein the log clamp members are driven to move between an inoperative position in which the log clamp members are separated to opposite sides of the longitudinal plane in a log receiving position, and a log clamping position in which the log clamp members are moved toward one another and toward the longitudinal plane;

wherein the log clamp members include upward ends that are spaced apart from one another in the log clamping position; and a linkage connecting the frame and clamp members and operable to move the clamp members toward the trough such that a log engaged by the clamp members is pulled against the trough.

2. A log positioning and securing device, as defined by claim 1, wherein the log clamp members are pivotably mounted to an elevationally movable post that is substantially centered on the longitudinal plane; and wherein said linkage includes a crank linkage connected between the frame and the post for elevationally moving the post to pull the log clamp members toward the trough walls such that a log clamped by the log clamp members will be forcibly pulled against the trough walls.

3. A log positioning and securing device, as defined by claim 1, wherein the log clamp members are semi circular in configuration to conform to lateral circular shapes of logs.

4. A log positioning and securing device, as defined by claim 1, further comprising:

a log ejector mounted to the frame and positioned for movement in relation to the trough between a first position below the trough and a second position above the first position;

wherein the log clamp members are pivotably mounted to an elevationally movable post that is substantially centered on the longitudinal plane; and further comprising a crank shaft connected between the frame, the post, and the log ejector for operating the log ejector and clamp members simultaneously between the respective first and second positions, and the log receiving and log clamping positions.

5. A log positioning and securing device, as defined by claim 1, further comprising adjustment studs mounted to the frame and engaging the log clamp members to facilitate selective adjustment of the operative position of the log clamp members.

6. A log positioning and securing device, as defined by claim 1, further comprising:

a log ejector mounted to the frame and positioned for movement in relation to the trough between a first position below the trough and a second position above the first position.

7. A log positioning and securing device, as defined by claim 1, further comprising:

a log ejector mounted to the frame and positioned for movement in relation to the trough between a first position below the trough and a second position above the first position and angularly oriented to enable a log to roll laterally from the trough.

8. A log positioning and securing device, as defined by claim 1, further comprising:

a log rotator mounted to the frame and operable to selectively rotate a log on a center axis.

9. A log positioning and securing device, as defined by claim 1, further comprising:

a log ejector mounted to the frame and positioned for movement in relation to the trough between a first position below the trough and a second position above the first position; and a log rotator mounted to the log ejector and operable to selectively rotate a log on a center axis.

10. A log positioning and securing device, comprising;

a stationary frame;

an elongated log receiving trough on the frame including downwardly converging trough sides positioned to receive and substantially center a log along a longitudinal plane;

at least two log clamps, each including a pair of log clamp members mounted to the frame and moveable between an inoperative position in which the log clamp members are situated at a first elevation, and an operative position below the first elevation in which the log clamp members form substantially semi-circular arcs with a center positioned at least approximately adjacent to the longitudinal plane, such that a log clamped by the log clamp members is pulled against the trough sides; and the semi-circular arcs being sized such that in the operative position the log clamp members are spaced apart to opposed sides of the longitudinal plane such that the log is gripped on opposite sides and a top portion of the log is exposed elevationally; and a clamp actuator interconnected between the frame and log clamp members and operable to forcibly shift the clamp members between the inoperative and operative positions.

11. A log positioning and securing device, as defined by claim 10, further comprising a log ejector mounted to the frame and positioned for movement in relation to the trough between a first position below the trough and a second position above the inoperative position of the clamp members.

12. A log positioning and securing device, as defined by claim 10, further comprising a log ejector mounted to the frame and positioned for movement in coordination with the clamp actuator and in relation to the trough between a first position below the trough and a second position above the inoperative position of the clamp members.

13. A log positioning and securing device, as defined by claim 10, further comprising a log rotator positioned to engage and selectively rotate a log to a selected position in relation to the trough.

14. A log positioning and securing device, comprising;

a frame;

a log receiving trough on the frame including trough sides positioned to receive and support a log along a longitudinal plane;

a log clamp including a pair of log clamp members mounted to the frame for elevational movement;

wherein the log clamp members are driven to move between an inoperative upper position in which the log clamp members are separated in a log receiving orientation, and an operative lower position in which the log clamp members clamp the log in a substantially centered relation to the longitudinal plane;

a log ejector mounted to the frame and positioned on the frame for movement in are arcuate direction for relation to the trough between a first position below the trough and a second position above the first position; and whereby a log on the trough may be lifted by the ejector and moved laterally with respect to the longitudinal plane and over the log clamp members.

15. A log positioning and securing device, as defined by claim 14, wherein a plurality of the log clamps are mounted along the frame and are connected to a common clamp actuator.

16. A log positioning and securing device, as defined by claim 14 wherein the trough sides converge in a "V" shape with a vertex of the "V" shape situated at least adjacent to the longitudinal plane.

17. A log positioning and securing device, as defined by claim 14 further comprising a log rotator mounted to the frame and positioned to engage and rotate a log to a selected position in relation to the trough.

18. A log positioning and securing device, as defined by claim 14 further comprising a log rotator mounted on the log ejector and positioned to engage and rotate a log to a selected position in relation to the trough.

* * * * *

UNITED STATES PATENT AND TRADEMARK OFFICE

CERTIFICATE OF CORRECTION

PATENT NO. : 6,267,544 B1 
DATED : July 31, 2001
INVENTOR(S) : Richard L. Neville It is certified that error appears in the above-identified patent and that said Letters Patent is hereby corrected as shown below:

Column 1,
Line 48, delete “4,78,035,” insert -- 4,378,035 --.

Column 5,
Line 22, after “appropriate”, delete “71”.
Line 58, delete “other”, insert -- the --.

Column 8,
Line 28, after “in” delete “are”, insert -- an --.
Line 28, after “direction” delete “for”, insert -- in --.

Signed and Sealed this

Third Day of June, 2003

JAMES E. ROGAN
*Director of the United States Patent and Trademark Office*